United States Patent
Bschor et al.

(10) Patent No.: US 11,546,578 B2
(45) Date of Patent: Jan. 3, 2023

(54) METHOD AND APPARATUS FOR CONTROLLING A GAIN OF AN AMPLIFIER OF A CABLE MODEM

(71) Applicant: Intel Corporation, Santa Clara, CA (US)

(72) Inventors: Walter Bschor, Munich (DE); Thushara Hewavithana, Chandler, AZ (US); Boaz Kol, Hod-Hasharon (IL)

(73) Assignee: INTEL CORPORATION, Santa Clara, CA (US)

( * ) Notice: Subject to any disclaimer, the term of this patent is extended or adjusted under 35 U.S.C. 154(b) by 62 days.

(21) Appl. No.: 16/976,082

(22) PCT Filed: May 6, 2019

(86) PCT No.: PCT/US2019/030806
§ 371 (c)(1),
(2) Date: Aug. 27, 2020

(87) PCT Pub. No.: WO2019/236228
PCT Pub. Date: Dec. 12, 2019

(65) Prior Publication Data
US 2021/0227205 A1    Jul. 22, 2021

(30) Foreign Application Priority Data

Jun. 6, 2018   (EP) ..................................... 18176330

(51) Int. Cl.
*H04N 17/04* (2006.01)
*H04N 21/61* (2011.01)
(Continued)

(52) U.S. Cl.
CPC ............... *H04N 17/04* (2013.01); *H04L 5/14* (2013.01); *H04N 21/44209* (2013.01);
(Continued)

(58) Field of Classification Search
CPC ............. H04N 17/04; H04N 21/44209; H04N 21/44245; H04N 21/6118; H04N 21/6168; H04L 5/14
(Continued)

(56) References Cited

U.S. PATENT DOCUMENTS 6,625,222 B1 *  9/2003  Bertonis .................... H04L 5/06
                                                      375/259
6,839,429 B1 *  1/2005  Gaikwad .................... H04L 5/14
                                                      370/201
(Continued)

FOREIGN PATENT DOCUMENTS

EP           1250006 A2    10/2002
KR      1020070071607 A     7/2007

*Primary Examiner* — John W Miller
*Assistant Examiner* — Sean N. Haiem
(74) *Attorney, Agent, or Firm* — 2SPL Patent Attorneys PartG mbB; Yong Beom Hwang

(57) ABSTRACT

A method and apparatus for controlling a gain of an amplifier of a cable modem operating in a full duplex (FDX) mode. A cable modem includes an amplifier configured to amplify a received signal, a power meter configured to measure a power of the received signal on a plurality of channels, and a control unit configured to estimate a maximum expected power to receive on the plurality of channels based on the measured power and set a gain of the amplifier based on the maximum expected power. The cable modem is configured to operate in a full duplex mode. The channels include a full duplex upstream channel, a full duplex downstream channel, and a legacy downstream channel. The maximum expected power may be estimated via a sounding procedure. A power spectral density may be measured and the maximum expected power may be derived from the power spectral density.

16 Claims, 6 Drawing Sheets

(51) Int. Cl.
  *H04L 5/14*  (2006.01)
  *H04N 21/442*  (2011.01)
(52) U.S. Cl.
  CPC ... *H04N 21/44245* (2013.01); *H04N 21/6118* (2013.01); *H04N 21/6168* (2013.01)
(58) Field of Classification Search
  USPC ......................................................... 348/192
  See application file for complete search history.

(56) References Cited

U.S. PATENT DOCUMENTS

| | | | |
|---|---|---|---|
| 2001/0055311 A1* | 12/2001 | Trachewsky | H04L 1/0006 370/445 |
| 2003/0067883 A1* | 4/2003 | Azenkot | H04N 7/17309 370/252 |
| 2005/0031097 A1* | 2/2005 | Rabenko | H04N 21/2383 379/93.31 |
| 2007/0076505 A1* | 4/2007 | Radtke | H04B 3/58 365/222 |
| 2008/0317176 A1* | 12/2008 | Oh | H03G 3/3078 375/345 |
| 2009/0059960 A1* | 3/2009 | Li | H04B 3/234 370/498 |
| 2010/0191525 A1* | 7/2010 | Rabenko | H04L 7/0029 704/211 |
| 2014/0011464 A1* | 1/2014 | Anderson | H04B 1/44 455/78 |
| 2017/0093555 A1* | 3/2017 | Hamzeh | H04B 3/32 |

* cited by examiner

METHOD AND APPARATUS FOR CONTROLLING A GAIN OF AN AMPLIFIER OF A CABLE MODEM

FIELD

Examples relate to controlling a gain of an amplifier of a cable modem, more particularly a method and apparatus for controlling a gain of an amplifier of a cable modem operating in a full duplex (FDX) mode.

BACKGROUND

FIG. 1 shows an example cable network 100. The multiple systems operators (MSOs) infrastructure (e.g. a Data Over Cable Service Interface Specification (DOCSIS) network) includes two primary components: a cable modem (CM) 110 and a cable modem termination system (CMTS) 120 that are connected via a hybrid fiber-coax (HFC) network 130. The cable modem 110 is located at or near the customer premises and the CMTS 120 is located at the cable network headend. The cable modem 110 may or may not be a DOCSIS 3.1 FDX-compatible cable modem.

A cable modem input amplifier is used to scale the input signal such that an optimal signal-to-quantization noise ratio is achieved at an analog-to-digital converter (ADC) output, while avoiding undesirable clipping. In former generations of the DOCSIS standards (i.e. DOCSIS 3.1 and previous versions), this could be achieved by implementing an automatic gain control (AGC) mechanism that measures the signal power continuously and adjusts the amplifier gain accordingly.

FIG. 2 shows an example implementation of an AGC in a cable modem. The output of the amplifier 210 (e.g. a low noise amplifier (LNA)) is measured by a power meter 220 and a feedback signal is sent back to the amplifier 210 via a low pass filter 230 for controlling a gain of the amplifier 210.

Since the signal power at the receiver input is stable the gain setting converges after a short period of time. The cable modem's upstream (US) signal is transmitted in bursts, whereas cable modem's downstream (DS) signal, which is the signal transmitted by the CMTS (the device transmitting the downstream to and receiving the upstream from all the cable modems and controlling the cable plant) is typically present all the time (continuous). Furthermore, cable modem's upstream and downstream signals occupy different regions of frequency spectrum as shown in FIG. 3. FIG. 3 shows the DOCSIS 3.1 spectrum plan for mid-split configuration. The DOCSIS 3.1 standard also defines sub-split and high-split spectrum plans where the upstream band ends at different frequencies and the downstream band starts at different frequencies. Both the sub-split and high-split spectrum plans also provide a sufficient guard band.

As shown in FIG. 3, the downstream band 310 and the upstream band 330 are separated by a guard band 320 of 23 MHz from 85 MHz to 108 MHz. Therefore, the downstream and upstream can be isolated from each other using a diplexer (filters). The guard band 320 provides a sufficient transition band for practical analogue filter implementation. With the filters in place, the signal at the input to the low noise amplifier in the receiver may only contain a downstream signal, which is in a continuous mode, and therefore has stable power over time.

In the recently developed DOCSIS 3.1 Full Duplex (FDX) systems it is not possible to isolate upstream and downstream signals at the cable modem input as it was in the legacy DOCSIS 3.1 systems. The reason is that a dedicated spectral region (called FDX band) is used to convey both upstream and downstream signals and hence the cable modem has to be able to receive and transmit in the FDX band. The FDX band 430 is located between the upstream-only band 420 and the downstream-only band 410 as shown in FIG. 4.

FIG. 4 shows the DOCSIS FDX spectrum plan. The FDX band 430 is divided into several sub-bands 432 (e.g. 3 sub-bands as shown in FIG. 4). Individual cable modems operate in a frequency division duplex (FDD) mode, meaning that a cable modem is not required to receive and transmit at the same time in the same FDX sub-band 432. Accordingly, each sub-band 432 is dedicated for either upstream or downstream traffic for each cable modem. Thus, there are 8 possible resource block allocations (RBA). The FDX sub-bands 432 are not fixed in their bandwidth or their location on the frequency axis. The DOCSIS FDX standard defines 8 different layouts of these FDX sub-bands 432. In addition, there are no guard-bands defined between the FDX sub-bands 432. For these three reasons (i.e. 8 different possibilities for the RBA, 8 different layouts of the FDX sub-bands 432, and lack of guard-bands between FDX sub-bands 432) protection of the cable modem's input from upstream signals by filtering may not be achieved efficiently and flexibly. Separating upstream and downstream by filtering would require 8 different filter banks which need to be selected dynamically with each change of the RBA. The selected FDX sub-bands layout requires different filter corner frequencies of the filter bank which requires to design cable modems specific for the FDX sub-band layouts. Additionally, due to the lack of guard-bands between the FDX sub-bands 432 and the finite slope of filter edges of analog filter designs would cause a significant reduction of data throughput. Hence the gain control mechanism has to be capable to optimize the LNA gain in the presence of upstream and downstream signal components.

FIG. 5 shows a self-interference signal and an interference signal to other cable modems in a cable network plant. A cable modem 510a transmits an upstream signal 502 to a CMTS 520 and receives a downstream signal 504 from the CMTS 520. The upstream signal originated by the signal transmitted by the cable modem 510a itself may appear on the receiver of the cable modem 510a since the isolation of the coupling circuitry (i.e. a coupler 540) combining upstream and downstream is not ideal. In addition, the cable modem 510a also gets a reflected upstream signal 508 of its own transmission from various points in the network, such as taps 530 in the physical coaxial cable plant. Taps 530 are passive devices used to combine upstream signals from different cable modems and to split downstream signal power to provide it to different cable modems. This signal component is called a self-interference (self IF) signal 508. The signal from the own transmitter is known and hence can be canceled by echo cancellation techniques before it reaches the amplifier input. Once the self-interference signal is largely cancelled using echo cancellation, the influence of this signal power on the LNA input can be neglected in a steady state.

On the other hand, a cable modem also receives an upstream signal transmitted in the FDX band from other cable modems. The upstream signals go through the coaxial plant between the cable modems including the taps 530. The taps 530 provide some isolation but it is not ideal. The example in FIG. 5 shows that an upstream signal 506 transmitted by a cable modem 510a appears at the receiver of a cable modem 510b. An upstream signal transmitted by one cable modem may appear at the receive input of other cable modems in some cases with a power level several dBs above the downstream power level.

An upstream signal is transmitted in bursts and hence the input signal power is not constant and can change abruptly by 10 dB or more. These changes may occur when other cable modems start transmitting upstream bursts, which couple to an input of a cable modem caused by the finite isolation of taps or other coupling devices on the coaxial plant. The time when power changes occur is unpredictable and hence a conventional gain control loop would not converge but always adapt to the changing power conditions. A constant gain receive chain from the input to the demodulator is required to be able to decode the signal without data loss or without using excessive margins.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
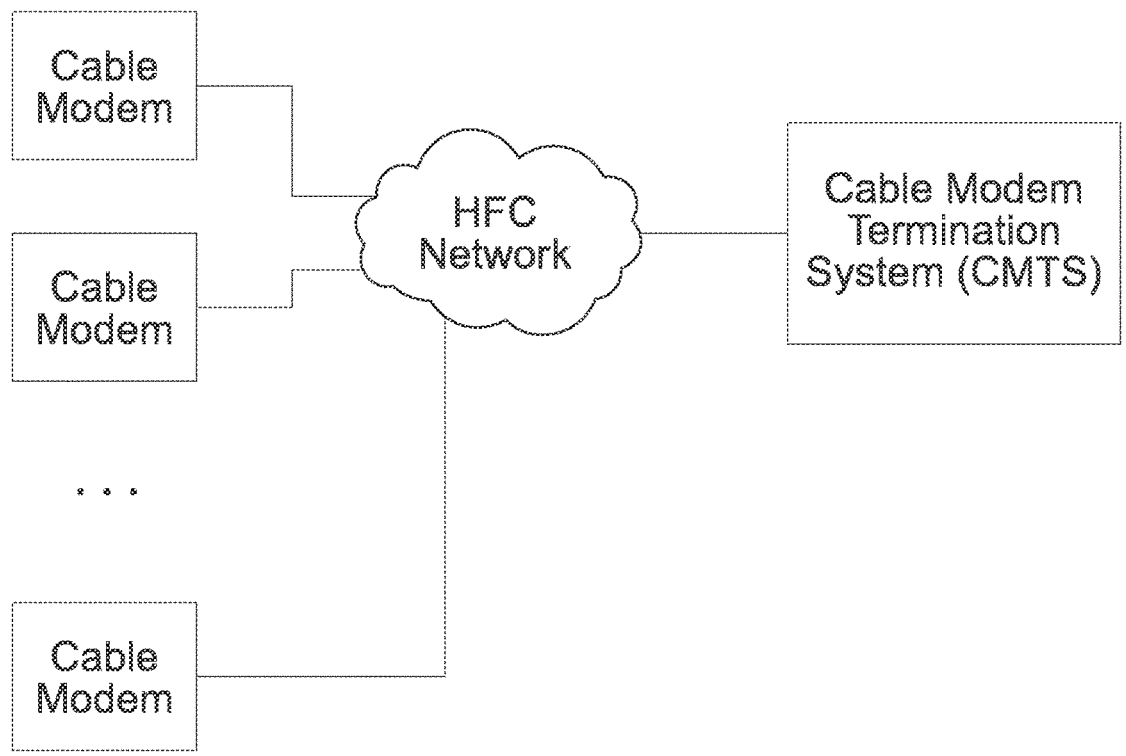
FIG. 1 shows an example cable network.
Figure 2:
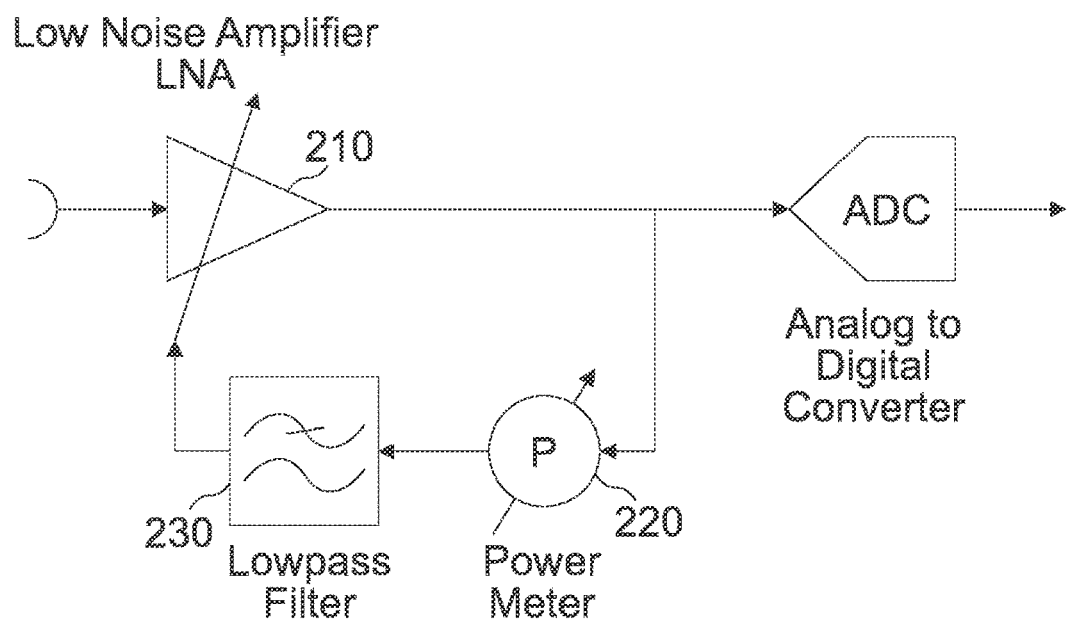
FIG. 2 shows an example implementation of an AGC in a cable modem.
Figure 3:
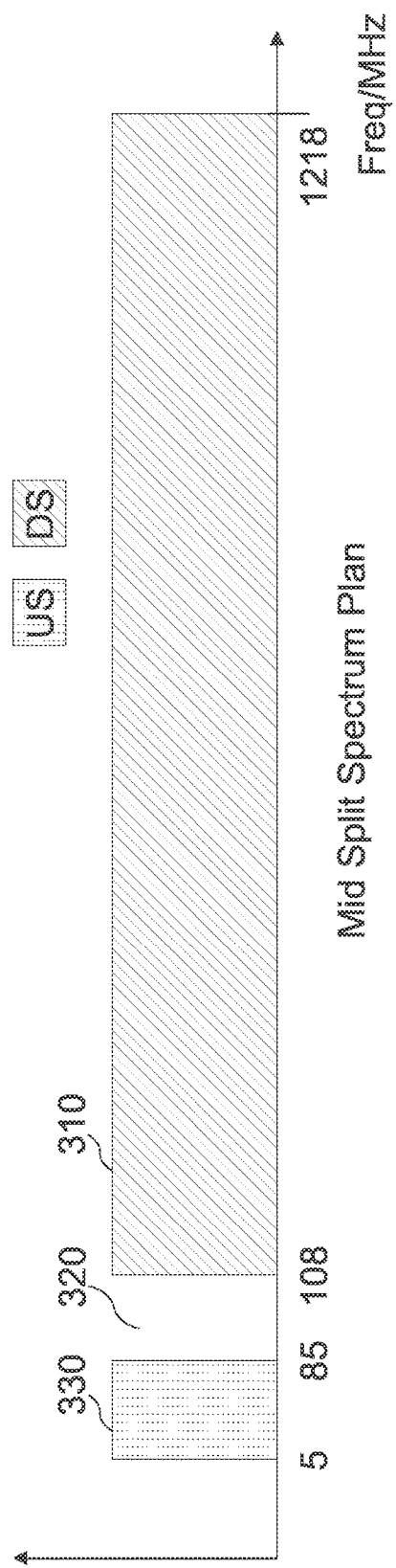
FIG. 3 shows the DOCSIS 3.1 spectrum plan for mid-split configuration.
Figure 4:
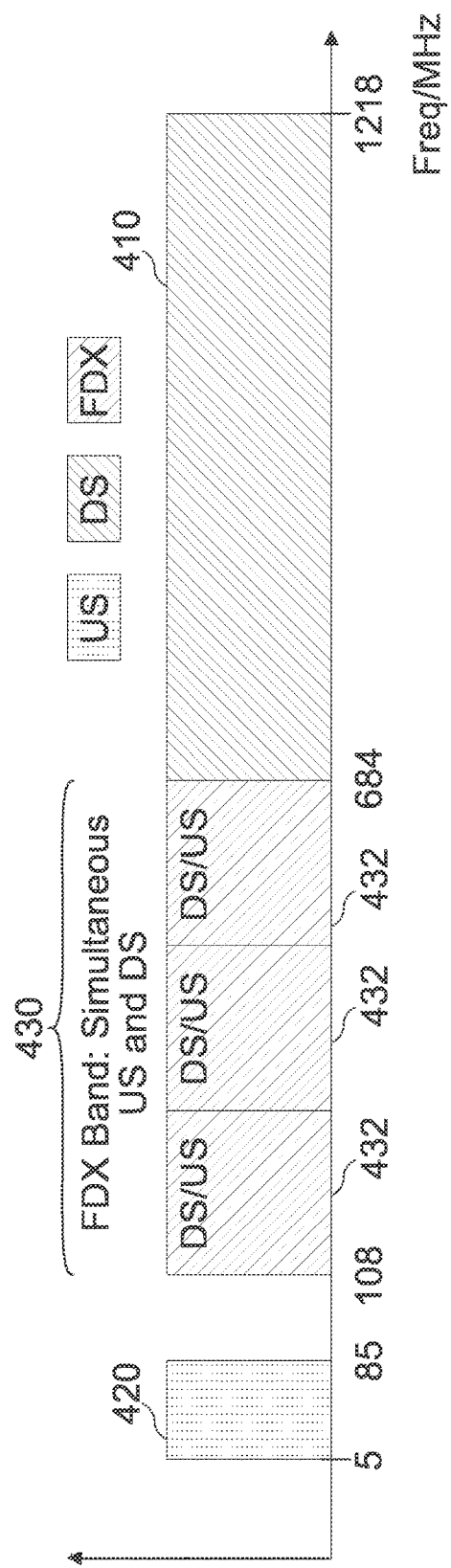
FIG. 4 shows the DOCSIS FDX spectrum plan.
Figure 5:
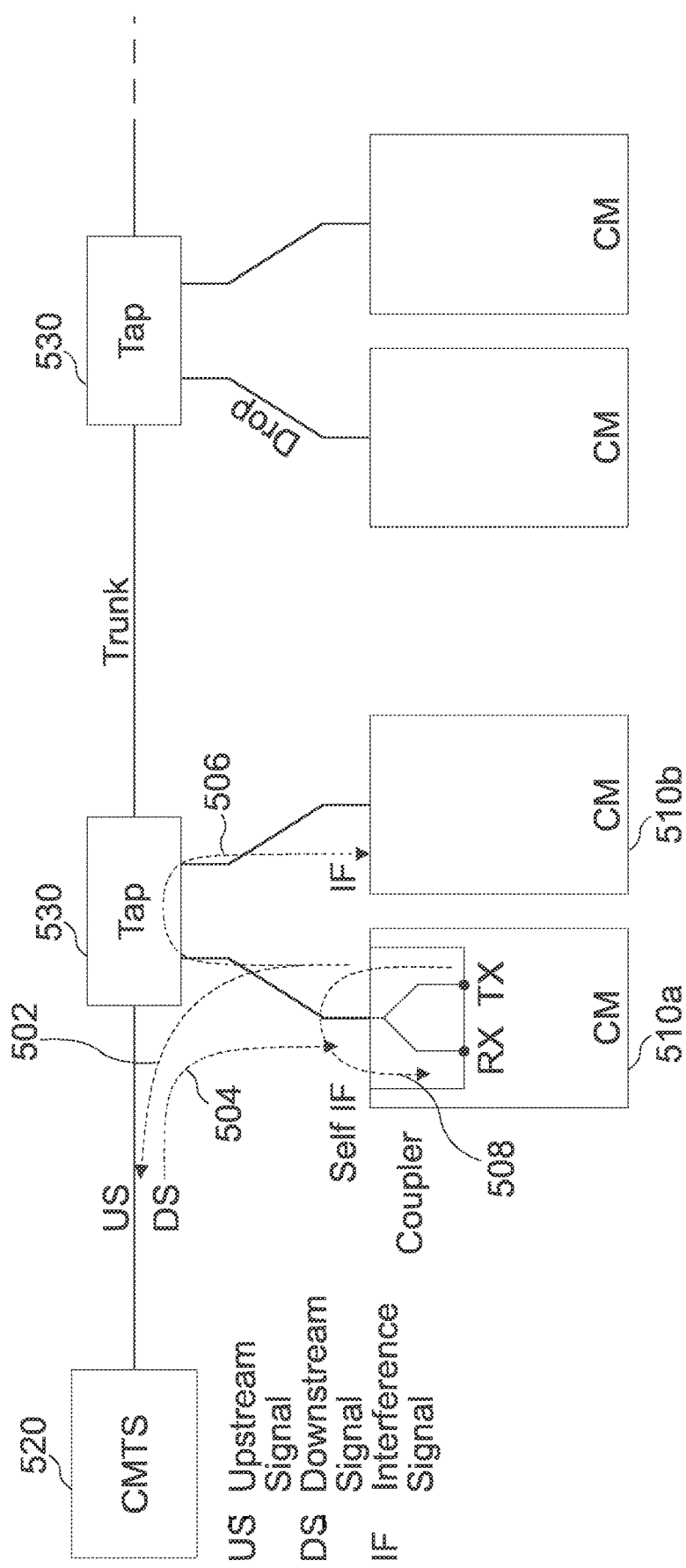
FIG. 5 shows a self-interference signal and an interference signal to other cable modems in a cable network plant.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof Unless otherwise defined, all terms (including technical and scientific terms) are used herein in their ordinary meaning of the art to which the examples belong.

Examples are disclosed for a method and apparatus for adaptive control of a gain of an amplifier (i.e. LNA) of a cable modem. In the examples, the maximum expected input power at the receiver of a cable modem is estimated and this knowledge is used to set the amplifier gain and freeze it during the time the cable modem is linked to the cable plant and operates. For example, the maximum expected input power may be estimated by measuring the power spectral density (PSD) or the composite power of the upstream sub-bands/bands entering the cable modem receiver input. Time and spectral bandwidth of upstream grants for any other cable modems are known and a measurement can be triggered accordingly. When the PSD or the power of all upstream sub-bands/bands from all other cable modems are measured the maximum expected input power may be estimated by choosing the maximum values for each upstream sub-band/band (i.e. channel) and summing the measured powers up over all upstream and downstream sub-bands/bands.

The estimated peak power of the input signal may be estimated and updated based on regular upstream data. Alternatively, the sounding protocol may be utilized, for example as specified in the DOCSIS 3.1 FDX standard, to measure the upstream composite power or PSDs of the FDX sub-bands appearing at the cable modem's input. During the sounding process the time periods of presence and absence of signals in the various channels are known, which facilitates measurement of the upstream power or PSDs.

For DOCSIS 3.1 standard implementation an AGC for a cable modem may be a fast AGC or a slow AGC. The fast AGC reacts to instantaneous conditions at the very beginning when a cable modem is linked to a cable network. The slow AGC relies on long term averaging of the input signal power and adapts the amplifier gain slowly. During joining to a cable network, a big change in the amplifier's gain may not cause a fault since it can happen before the cable modem is demodulating and decoding downstream signals. After that the slow AGC can track the input signal power. Changes in the input power may be caused by changes in the environment which are expected to be very slow for the cable environment.

The example methods disclosed herein may estimate the maximum expected power (e.g. the worst-case input power condition) and set the amplifier gain based on the maximum expected power to achieve a best signal-to-quantization noise ratio, while avoiding truncation or clipping of the signal in the receiver's ADC. The conventional solutions defined for DOCSIS 3.1 and former systems may not solve the problems and would always adapt to the changing input power conditions and thus corrupt the downstream signals and cause packet losses.

In some examples, the regular upstream data transmissions from other cable modems may be used to estimate a peak power. A cable modem may measure and record the power of the regular upstream data transmissions from other cable modems and may determine the maximum expected power based on the measured power. During upstream bursts according to a grant, an upstream PSD or composite power may be measured. Information on the upstream PSDs or power may be gathered over time to get enough information to estimate the peak power. A specific period in which a new cable modem is joining the system is appropriate to measure the upstream sub-bands power or PSD.

In order to lower the amount of interference to the downstream signal in the FDX band due to poor tap isolation, cable modems are grouped into transmission groups (TG), utilizing the sounding procedure. The sounding procedure, defined in the DOCSIS 3.1 FDX standard, is invoked to estimate the influence of one cable modem to another. Cable modems that are strongly interfering each other are grouped into the same TG. Cable modems in the same TG share the same resource block allocation (RBA), i.e., the cable modems in the same TG all get the same assignment either upstream or downstream in each FDX sub-band. This means that if one cable modem in the TG is instructed to transmit upstream signal in a certain FDX sub-band, then all other cable modems in the same TG are not expected to receive in the same sub-band.

The DOCSIS 3.1 FDX standard defines two phases for the sounding procedure, a first period of time in which for a dedicated FDX sub-band a transmission of upstream signal is inhibited for all cable modems, and a second period in which only one cable modem transmits in a dedicated FDX sub-band. The first period of sounding is called "initial period," and the second period is called "measurement period."

Two methods for sounding are described in DOCSIS 3.1 FDX standard: the orthogonal frequency division multiple access (OFDMA) upstream data profile (OUDP) method and the continuous wave tone (CWT) method. The OUDP method uses full active upstream sub-band whereas the CWT method uses a sub-set of sub-carriers of the active upstream sub-band. The procedure for both methods is very similar. The examples will be explained hereafter with reference to the procedure for the OUDP method. The differences for the CWT method will be explained afterwards.

Figure 6:
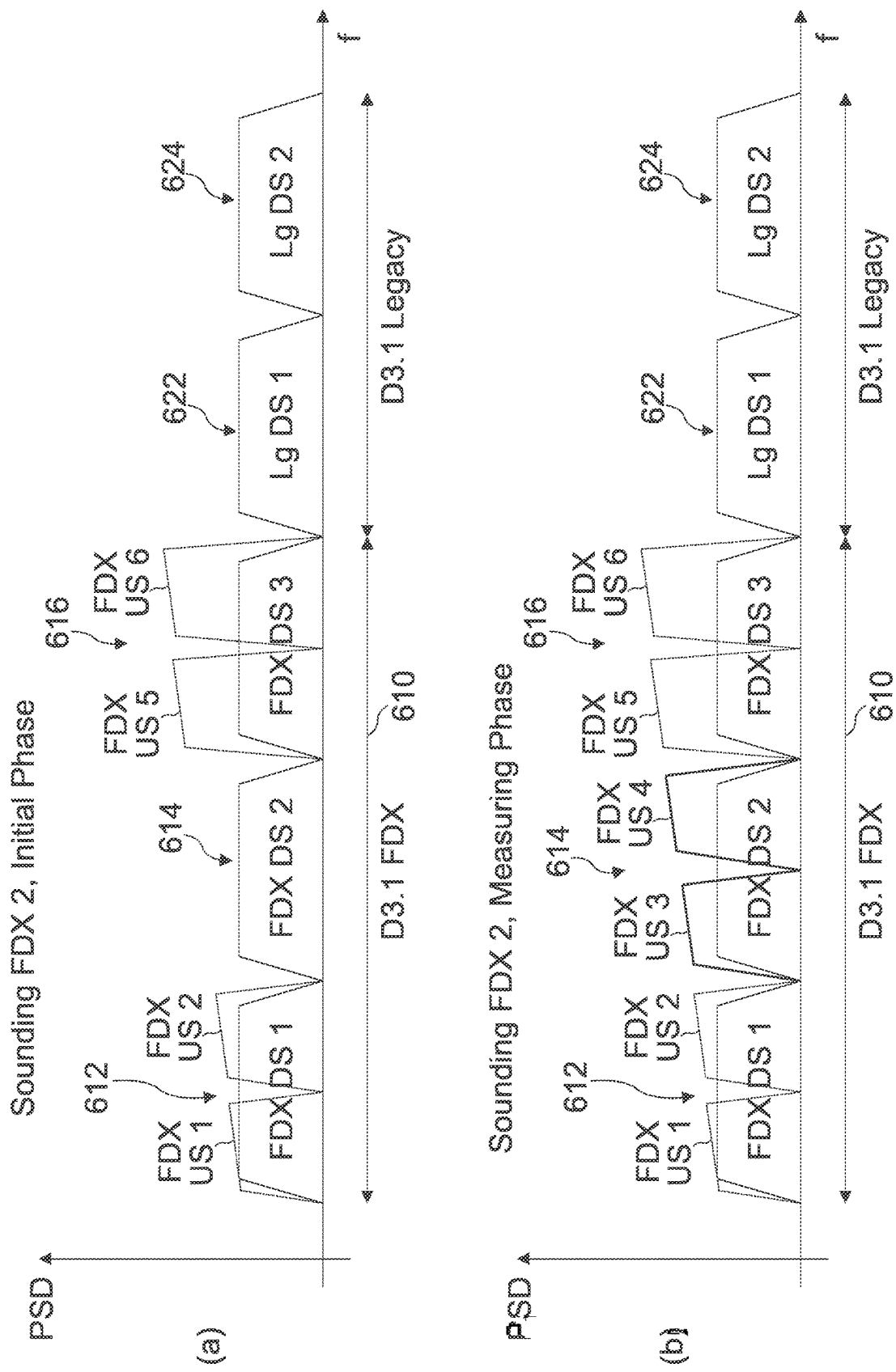
FIGS. 6(a) and 6(b) show an example signal spectrum during initial and measurement periods of sounding, respectively.

FIGS. 6(a) and 6(b) show an example signal spectrum during the initial period and the measurement period of sounding, respectively. The example in FIGS. 6(a) and 6(b) show the FDX band 610 comprising three FDX sub-bands 612, 614, 616 and two additional legacy downstream bands 622, 624. In the example shown in FIGS. 6(a) and 6(b), the FDX sub-band 614 is being sounded. The FDX sub-bands 612, 616 may be sounded at different times (before or after the FDX sub-band 614). During the initial period of sounding, the CMTS may instruct all cable modems to be silent on the FDX sub-band 614. This period may be used to measure the power in the legacy downstream bands 622, 624 and in the FDX sub-band(s) which is determined to convey only a downstream signal.

During the measurement period, one modem (test modem) is determined to transmit an upstream signal in the FDX sub-band 614 being sounded and all other modems (measuring modems) listen to the FDX sub-band 614 and measure the power on the FDX sub-band 614. FIG. 6(b) shows example signal spectrum during the measurement period of sounding. During that time the regarded FDX sub-band's power of the downstream signal plus the power of the test modem's upstream signal, coupled to the input of the measuring modem may be measured. The measurement period may be repeated for all cable modems in the cable plant one after another (i.e. full mesh sounding). The input power is measured separately for all other cable modems and the measured values are stored. The sounding may be executed for all FDX sub-bands. After sounding is completed, the cable modem knows the received power from all FDX upstream sub-bands of other cable modems. The measuring modem finds for each of the FDX upstream sub-bands the cable modem that produces the maximum interference power value. These values are selected to calculate the maximum expected power that can be expected at the receiver input. The maximum expected power is calculated by summing the power of the downstream bands (including downstream FDX sub-bands and legacy downstream bands) plus the values for the upstream FDX sub-bands selected as described above. Optional power boosting for sounding may necessitate adjustments in the calculation.

Figure 7:
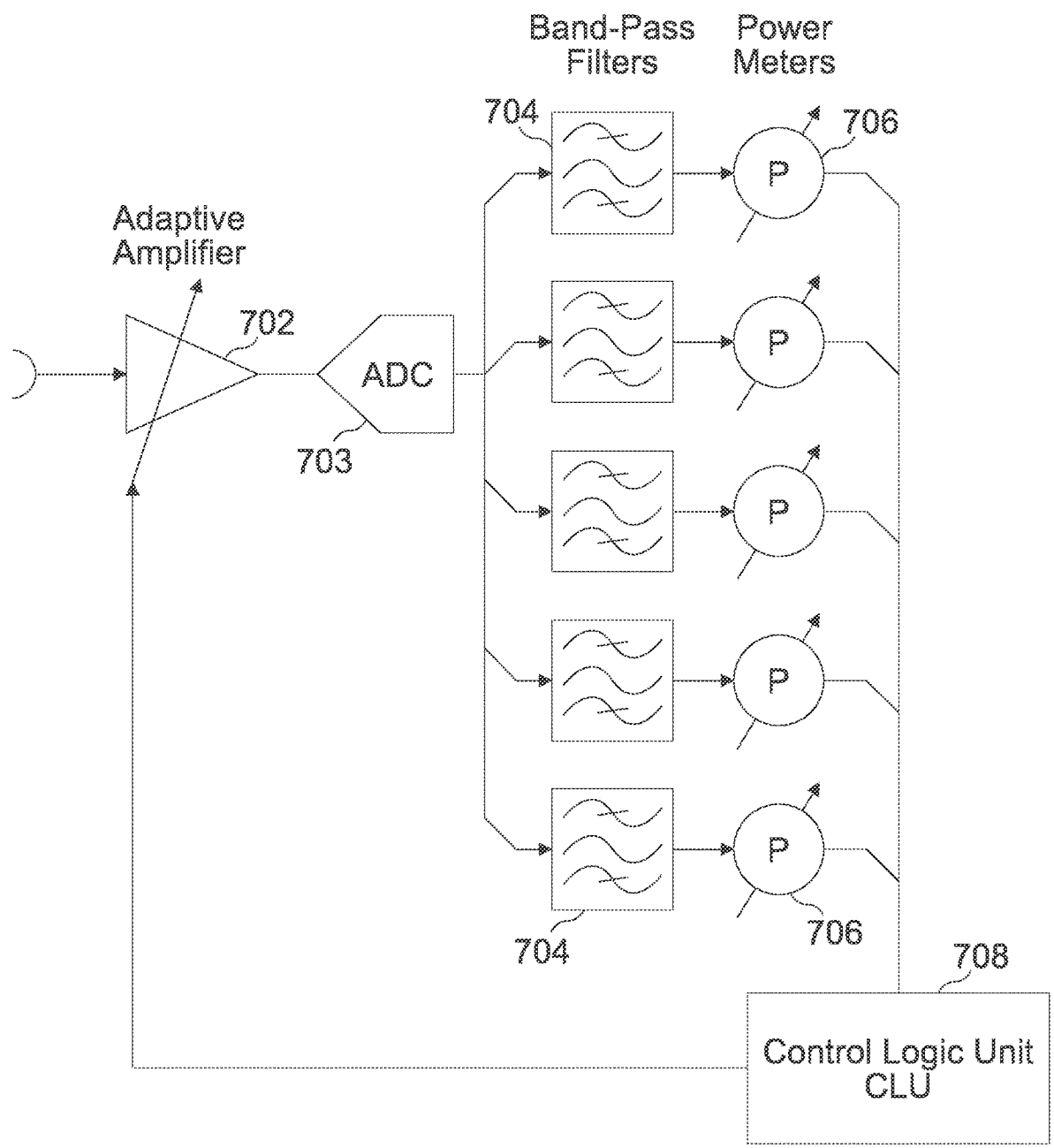
FIG. 7 shows an example implementation of gain control system in a cable modem in accordance with one aspect.

FIG. 7 shows an example implementation of gain control system in a cable modem in accordance with one aspect. The input signal to a cable modem receiver is amplified by an amplifier 702.

The amplifier output may be converted to a digital domain by an ADC 703 and then may be split into several bands (e.g. FDX sub-bands and legacy downstream bands) using band-pass filters 704 (e.g. digital filters). For each band the power is measured by a power meter(s) 706 and the measured power value is provided to the control logic unit (CLU) 708 (i.e. a controller). The CLU 708 performs and controls the measurement procedures (e.g. via the sounding procedure explained above), evaluates the results (i.e. calculates the maximum expected power), and decides on the gain of the amplifier 702.

To get a more precise estimate of the maximum expected power, a PSD rather than the power of each upstream sub-band may be measured. The maximum PSD value, selected out of the PSDs of the cable modems, is used to generate a maximum expected PSD and the maximum expected input power may be derived by integrating the maximum expected PSD over frequency.

When using the CWT method, during the measuring phase the CMTS instructs one cable modem at a time to transmit a set of sub-carriers in an FDX upstream sub-band, named as CW tones. Other cable modems are instructed to receive the signal in this sub-band. Since not all tones of the FDX upstream sub-band are selected to be transmitted by the transmitting cable modem, the receiving cable modems may measure the power of the CW tones, and the power of the FDX upstream sub-band may be estimated by interpolating the power for the tones between the CW tones. The FDX downstream sub-band power may be estimated by measuring the power of the non-CW tones, and the CW tones downstream power may be estimated by interpolation. Similar to the OUDP method, power boosting for sounding may necessitate adjustments in the calculation. Same as for the OUDP method, the measurements may be used to estimate the PSDs of the upstream sub-bands and to generate a maximum expected PSD.

For both OUDP and CWT methods, after completion of the sounding process, the power of the downstream bands (FDX downstream sub-bands and legacy downstream bands) and the interference power of all FDX upstream sub-bands from other cable modems are known. For example, the maximum expected power at a cable modem's input ($P_{max\text{-}est}$) may be estimated as in Equation (1) below.

$$P_{max\text{-}est} = \Sigma_{b=1}^{B} \max_m(P_{FDX\text{-}US\text{-}b}(CM_m)) + \Sigma_{c=1}^{C} P_{FDX\text{-}DS\text{-}c} + \Sigma_{d=1}^{D} P_{LG\text{-}DS\text{-}d}. \quad \text{Equation (1)}$$

In Equation (1), the following notations are used:

$P_{FDX\text{-}US\text{-}b}(CM_m)$: The interference power of FDX upstream sub-band b of cable modem m, B: The total number of upstream sub-bands, $P_{FDX\text{-}DS\text{-}c}$: The received power of the FDX downstream sub-band c, C: The total number of FDX downstream sub-bands, $P_{LG\text{-}DS\text{-}d}$: The receive power of the legacy downstream band d, D: The total number of legacy downstream bands, and $P_{max\text{-}est}$: The maximum power expected at the cable modem receiver's input.

For each FDX upstream sub-band, the power of the strongest cable modem may be selected. The strongest power values of all FDX upstream sub-bands may be summed. The power of the downstream band's power may be accumulated to get the maximum expected power.

The amplifier gain g may be calculated by dividing the known ADC full scale power by the estimated maximum expected power, as in Equation (2). The peak-to-average power ratio (PAPR) of the OFDM signal may be regarded by applying an appropriate back-off factor.

$$g = \frac{P_{ADC\_Full\_scale}}{P_{max\_est}} \cdot \frac{1}{\text{backoff}}, \quad \text{Equation (2)}$$

where $P_{ADC\text{-}Full\text{-}Scale}$ is the power at the input to the ADC corresponding to its maximum digital output.

Figure 8:
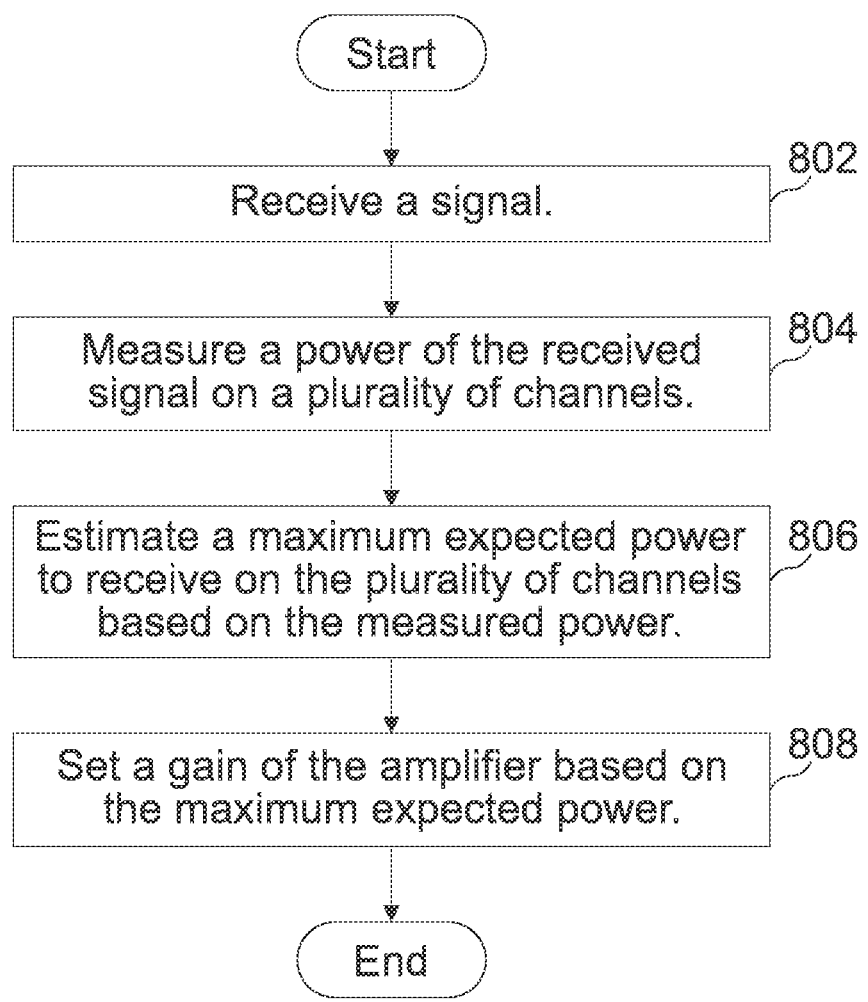
FIG. 8 is a flow diagram of an example method for adaptive control of a gain of an amplifier in a receiver of a cable modem connected to a cable network.

FIG. 8 is a flow diagram of an example method for adaptive control of a gain of an amplifier in a receiver of a cable modem connected to a cable network. A cable modem receives a signal (802). The cable modem measures a power of the received signal on a plurality of channels (804). The cable modem estimates a maximum expected power to receive on the plurality of channels based on the measured power, as disclosed above (806). The cable modem then sets a gain of the amplifier based on the maximum expected power (808).

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The examples as described herein may be summarized as follows:

Example 1 is a cable modem, comprising an amplifier configured to amplify a received signal, a power meter configured to measure a power of the received signal on a plurality of channels, and a control unit configured to estimate a maximum expected power to receive on the plurality of channels based on the measured power and set a gain of the amplifier based on the maximum expected power.

Example 2 is the cable modem of example 1, wherein the cable modem is configured to operate in a full duplex mode.

Example 3 is the cable modem of example 2, wherein the channels include a full duplex upstream channel, a full duplex downstream channel, and a legacy downstream channel, and the maximum expected power includes an interference power caused by an upstream transmission from another cable modem on the full duplex upstream channel and a received downstream power from a cable modem termination system on the full duplex downstream channel and the legacy downstream channel.

Example 4 is the cable modem of example 3, wherein the maximum expected power is estimated via a sounding procedure. During the sounding procedure, the cable modems connected to a cable network are instructed to transmit an upstream transmission on the full duplex upstream channel one by one while other cable modems are instructed to measure a received power on the full duplex upstream channel. The control unit is configured to select a cable modem that generates a maximum interference for each full duplex upstream channel.

Example 5 is the cable modem of example 4, wherein the upstream transmission is transmitted over either an entire set of sub-carriers of the full duplex upstream channel or a sub-set of sub-carriers of the full duplex upstream channel.

Example 6 is the cable modem as in any one of examples 1-5, wherein the control unit is configured to determine the gain by dividing an analog-to-digital converter full scale power by the maximum expected power.

Example 7 is the cable modem as in any one of examples 1-6, wherein the control unit is configured to measure a power spectral density and estimate the maximum expected power from the power spectral density.

Example 8 is the cable modem as in any one of examples 1-7, wherein regular upstream data transmissions from other cable modems are used to estimate the maximum expected power.

Example 9 is a method for adaptive control of a gain of an amplifier in a receiver of a cable modem connected to a cable network. The method includes receiving a signal, measuring a power of the received signal on a plurality of channels, estimating a maximum expected power to receive on the plurality of channels based on the measured power, and setting a gain of the amplifier based on the maximum expected power.

Example 10 is the method of example 9, wherein the cable modem is configured to operate in a full duplex mode.

Example 11 is the method of example 10, wherein the channels include a full duplex upstream channel, a full duplex downstream channel, and a legacy downstream channel, and the maximum expected power includes an interference power caused by an upstream transmission from another cable modem on the full duplex upstream channel and a received downstream power from a cable modem termination system on the full duplex downstream channel and the legacy downstream channel.

Example 12 is the method of example 11, wherein the maximum expected power is estimated via a sounding procedure. During the sounding procedure, the cable modems connected to the cable network are instructed to transmit an upstream transmission on the full duplex upstream channel one by one while other cable modems are instructed to measure a received power on the full duplex upstream channel. The cable modem that generates a maximum interference is selected for each full duplex upstream channel.

Example 13 is the method of example 12, wherein the upstream transmission is transmitted over either an entire set of sub-carriers of the full duplex upstream channel or a sub-set of sub-carriers of the full duplex upstream channel.

Example 14 is the method as in any one of examples 9-13, wherein the gain is determined by dividing an analog-to-digital converter full scale power by the maximum expected power.

Example 15 is the method as in any one of examples 9-14, wherein a power spectral density is measured and the maximum expected power is derived from the power spectral density.

Example 16 is the method as in any one of examples 9-15, wherein regular upstream data transmissions from other cable modems are used to estimate the maximum expected power.

Example 17 is a machine-readable storage medium including machine readable instructions, when executed, to implement a method as in any one of examples 9-16.

Example 18 is a cable modem, comprising a means for amplifying a received signal, a means for measuring a power of the received signal on a plurality of channels, and a control means for estimating a maximum expected power to receive on the plurality of channels based on the measured power and setting a gain of the amplifying means based on the maximum expected power.

Example 19 is the cable modem of example 18, wherein the cable modem is configured to operate in a full duplex mode.

Example 20 is the cable modem of example 19, wherein the channels include a full duplex upstream channel, a full duplex downstream channel, and a legacy downstream channel, and the maximum expected power includes an interference power caused by an upstream transmission from another cable modem on the full duplex upstream channel and a received downstream power from a cable modem termination system on the full duplex downstream channel and the legacy downstream channel.

Example 21 is the cable modem of example 20, wherein the maximum expected power is estimated via a sounding procedure. During the sounding procedure, the cable modems connected to a cable network are instructed to transmit an upstream transmission on the full duplex upstream channel one by one while other cable modems are instructed to measure a received power on the full duplex upstream channel. The control means is configured to select a cable modem that generates a maximum interference for each full duplex upstream channel.

Example 22 is the cable modem of example 21, wherein the upstream transmission is transmitted over either an entire set of sub-carriers of the full duplex upstream channel or a sub-set of sub-carriers of the full duplex upstream channel.

Example 23 is the cable modem as in any one of examples 18-22, wherein the control means is configured to determine the gain by dividing an analog-to-digital converter full scale power by the maximum expected power.

Example 24 is the cable modem as in any one of examples 18-23, wherein the control means is configured to measure a power spectral density and estimate the maximum expected power from the power spectral density.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A cable modem, comprising:
an amplifier configured to amplify a received signal;
a power meter configured to measure a power of the received signal on a plurality of channels; and
a control unit configured to estimate a maximum expected power to receive on the plurality of channels based on the measured power and set a gain of the amplifier based on the maximum expected power,
wherein the cable modem is configured to operate in a full duplex mode,
wherein the channels include one or more of a full duplex upstream channel, a full duplex downstream channel, and a legacy downstream channel, and the maximum expected power includes an interference power caused by an upstream transmission from another cable modem on the full duplex upstream channel and a received downstream power from a cable modem termination system on the full duplex downstream channel and the legacy downstream channel,
wherein the maximum expected power is estimated via a sounding procedure, wherein at least one cable modem connected to a cable network transmits an upstream transmission on the full duplex upstream channel while at least one other cable modem is instructed to measure a received power on the full duplex upstream channel, wherein the control unit is configured to select a cable modem that generates an interference for at least one full duplex upstream channel.

2. The cable modem of claim 1, wherein the upstream transmission is transmitted over either an entire set of sub-carriers of the full duplex upstream channel or a sub-set of sub-carriers of the full duplex upstream channel.

3. The cable modem of claim 1, wherein the control unit is configured to determine the gain by dividing an analog-to-digital converter full scale power by the maximum expected power.

4. The cable modem of claim 1, wherein the control unit is configured to measure a power spectral density and estimate the maximum expected power from the power spectral density.

5. The cable modem of claim 1, wherein regular upstream data transmissions from other cable modems are used to estimate the maximum expected power.

6. A method for adaptive control of a gain of an amplifier in a receiver of a cable modem connected to a cable network, the method comprising:
receiving a signal;
measuring a power of the received signal on a plurality of channels;
estimating a maximum expected power to receive on the plurality of channels based on the measured power; and
setting a gain of the amplifier based on the maximum expected power,
wherein the cable modem is configured to operate in a full duplex mode,
wherein the channels include one or more of a full duplex upstream channel, a full duplex downstream channel, and a legacy downstream channel, and the maximum expected power includes an interference power caused by an upstream transmission from another cable modem on the full duplex upstream channel and a received downstream power from a cable modem termination system on the full duplex downstream channel and the legacy downstream channel,
wherein the maximum expected power is estimated via a sounding procedure, wherein at least one cable modem connected to a cable network transmits an upstream transmission on the full duplex upstream channel while at least one other cable modem is instructed to measure a received power on the full duplex upstream channel, wherein the control unit is configured to select a cable modem that generates an interference for at least one full duplex upstream channel.

7. The method of claim 6, wherein the upstream transmission is transmitted over either an entire set of sub-carriers of the full duplex upstream channel or a sub-set of sub-carriers of the full duplex upstream channel.

8. The method of claim 6, wherein the gain is determined by dividing an analog-to-digital converter full scale power by the maximum expected power.

9. The method of claim 6, wherein a power spectral density is measured and the maximum expected power is derived from the power spectral density.

10. The method of claim 6, wherein regular upstream data transmissions from other cable modems are used to estimate the maximum expected power.

11. A non-transitory machine-readable storage medium including machine readable instructions, when executed, to implement a method of claim 6.

12. An apparatus in a cable network, comprising:
a means for receiving a signal;
a means for measuring a power of the received signal on a plurality of channels;
a means for estimating a maximum expected power to receive on the plurality of channels based on the measured power; and
a means for setting a gain of an amplifier for amplifying the received signal based on the maximum expected power,
wherein the cable modem is configured to operate in a full duplex mode,
wherein the channels include one or more of a full duplex upstream channel, a full duplex downstream channel, and a legacy downstream channel, and the maximum expected power includes an interference power caused by an upstream transmission from another cable modem on the full duplex upstream channel and a received downstream power from a cable modem termination system on the full duplex downstream channel and the legacy downstream channel, wherein the maximum expected power is estimated via a sounding procedure, wherein at least one cable modem connected to a cable network transmits an upstream transmission on the full duplex upstream channel while at least one other cable modem is instructed to measure a received power on the full duplex upstream channel, wherein the control unit is configured to select a cable modem that generates an interference for at least one full duplex upstream channel.

13. The apparatus of claim 12, wherein the upstream transmission is transmitted over either an entire set of sub-carriers of the full duplex upstream channel or a sub-set of sub-carriers of the full duplex upstream channel.

14. The apparatus of claim 12, wherein the gain is determined by dividing an analog-to-digital converter full scale power by the maximum expected power.

15. The apparatus of claim 12, wherein a power spectral density is measured and the maximum expected power is derived from the power spectral density.

16. The apparatus of claim 12, wherein regular upstream data transmissions from other cable modems are used to estimate the maximum expected power.

* * * * *